Figures 1, 2, 3, 4, 5:
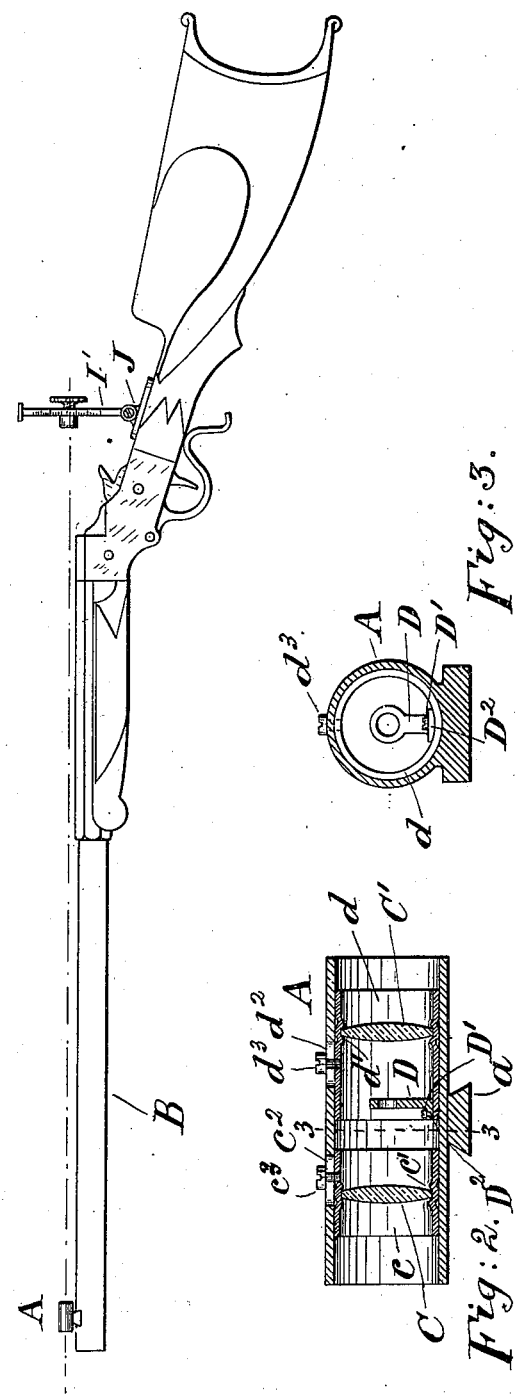

No. 649,194. Patented May 8, 1900.
J. W. CARVER.
SIGHT FOR FIREARMS.
(Application filed May 5, 1899.)
(No Model.)

Witnesses:
P. Albertine
L. T. Sullivan

James W. Carver Inventor
By his Attorney

UNITED STATES PATENT OFFICE.

JAMES W. CARVER, OF PAWLET, VERMONT.

SIGHT FOR FIREARMS.

SPECIFICATION forming part of Letters Patent No. 649,194, dated May 8, 1900.

Application filed May 5, 1899. Serial No. 715,642. (No model.)

*To all whom it may concern:*

Be it known that I, JAMES W. CARVER, a citizen of the United States, residing at Pawlet, in the county of Rutland and State of Vermont, have invented new and useful Improvements in Sights for Firearms, of which the following is a specification.

This invention relates to sights for firearms, and it bears more particularly upon the employment of sights with rifles and is described and illustrated in this specification with reference to that particular weapon, although it may, as will be very clearly understood, be equally well applied to firearms of other character.

The invention contemplates the employment of a globe and peep sight similar to those now in use, but with the addition of one or more convex lenses attached to and inserted in the tube of the globe or front sight and one or more concaved lenses attached to the peep or rear sight of the rifle, thereby providing a focus and a perfect telescopic sight within the ordinary range of a rifle, and the shot can be placed with greater exactness than was otherwise possible.

I avoid by my invention the use of the extra mountings that have hitherto been required in the use of telescopic sights, and I also do away with the continuous tube and mountings therefor upon the rifle. Furthermore, the parts of the sight are fixed and not liable to become disarranged. The side lights are not broken, but natural light is available between the front and rear sights. A spirit or mechanical level can be employed just the same as without this device. The globe and peep sights are manipulated the same as if without lenses, and sighting-beads of any and all shapes may be used.

I am aware that lenses have been applied to a single rear or front sight to take the place of eyeglasses for defective sight, and I myself am the patentee of one invention for this purpose; but this my present invention is intended to take the place of a telescope combined with a globe and peep or front and rear sights.

In the drawings accompanying this specification, Figure 1 is a side elevation of a rifle equipped with my improved sights. Fig. 2 is a side sectional view of the front sight enlarged. Fig. 3 is a transverse section taken on the line 3 3 of Fig. 2. Fig. 4 is a detail enlarged side sectional view of the rear sight, the same being partly broken away; and Fig. 5 is a detail front view of a form of sighting-bead.

In the said views the letter A indicates a tube or barrel having the usual dovetail connection $a$ to secure it upon a barrel B of a rifle. Said tube A may contain one or more convex lenses, and, as here shown, two of such lenses C C' are provided therein. My means of adjusting the convex lenses are as follows: I employ a tube $c$, provided with an interior annular groove $c'$, which may be formed by crimping or otherwise, and which groove $c'$ is intended to and does contain and support the convex lens C. A slot $c^2$ is formed in the tube A, and a set-screw $c^3$ is passed therethrough and serves to bind and secure the tube $c$ in place, the slot $c^2$ serving for longitudinal adjustment of the tube $c$ within tube A. For the convex lens C', I provide a similar containing and supporting tube $d$, having annular groove $d'$, and a slot $d^2$ is formed in tube A therefor, together with a set-screw $d^3$.

A sighting-bead D is adjusted intermediate the convex lenses C C', and it may, as here shown, be supported and secured within the tube $d$, as by set-screw $d'$, which, as seen, is passed through a right-angular flange $D^2$, pertaining to the sighting-bead. Said sighting-bead may be of any known character, and in Fig. 5 I have shown one of the crossed-hair variety.

In Fig. 4 will be seen a peep or rear sight constructed according to my invention, the same comprising a short tube E, having a support therein, made in this instance by slightly crimping the tube and adapted to contain a double-concave lens F. A cap E' is screwed upon the front of the tube E and is provided with a central peep-hole, and tube E at its other end is interiorly threaded and adapted to be screwed upon and thus secured to a disk G, said disk having a central aperture, which is also threaded, into which is screwed one end of a peep-tube H. Said peep-tube H has a shoulder H', as seen, and said tube is passed through a slot I in a post I', the peep-tube being adapted to be moved vertically within the slot in order to obtain a desired degree of range. For this latter purpose the post I' is marked with the usual scale, said post also being pivoted to a base J, which latter is mounted upon the stock of the rifle. To move the said peep-sight vertically, the screw upon the tube H is slightly loosened, and after adjustment to the correct height said screw is again tightened by manipulating the thumb-screw portion K.

A double-concave lens is used in connection with the rear sight, as it serves to counteract any imperfections in sight caused by the use of the two double-convex lenses used in connection with the front sight. A single-concave lens will but imperfectly answer; but where the lens is made concave upon both sides most excellent results are obtained.

Having now described my invention, I declare that what I claim is—

1. A sight for firearms, comprising a main sight consisting of a tube provided with two convex lenses and a sighting-bead placed between them, combined with a rear sight consisting of a short tube, a concave lens placed therein, a cap placed over the front end of the tube, and containing a peep-hole, a peep-tube connected to the rear end of the tube, and the slotted post I' to which the tube is applied, substantially as shown and described.

2. A rear sight for a firearm consisting of a slotted post, a tube provided with a perforated cap or cover at its front end, and a concave lens placed in the tube, combined with a cover for the rear end of the tube, a peep-tube screwed into this cover, and which is adapted to clamp the tube in position upon the post, substantially as set forth.

3. A front sight for a firearm consisting of the slotted tube A, two shorter tubes placed therein, and held in position by means of set-screws, and the lenses placed in said tubes, and adapted to be adjusted independently of each other, combined with a sighting-bead placed between the two lenses and secured to one of the tubes so as to be movable therewith, substantially as described.

4. In a sight for firearms, the slotted tube A, the two shorter tubes c, d, placed therein, and adapted to be adjusted in the tube A independently of each other, set-screws for securing the tubes in position, a convex lens placed in each of the tubes, and a sighting-bead placed between the two convex lenses, combined with the supporting-post, the short tube E mounted thereon, and provided with a cover at its front end having a peep-hole, the concave lens placed in said tube, a cover for the inner end, a peep-tube screwed into said cover and acting as a clamp to hold the tube E in position upon the sight, substantially as specified.

In testimony whereof I have hereunto set my hand in the presence of two subscribing witnesses.

JAMES W. CARVER.

Witnesses:
JAMES N. ROBINSON,
CARL N. ROBINSON.